United States Patent [19]

Scott et al.

[11] 4,009,527
[45] Mar. 1, 1977

[54] COORDINATED COLOR CHART SYSTEM, AND METHOD FOR PRODUCING SAME

[75] Inventors: Camilla Ann Scott, Reston, Va.; Elizabeth L. Zimmerman, Washington, D.C.

[73] Assignee: The United States of America as represented by the Secretary of the Interior, Washington, D.C.

[22] Filed: Nov. 6, 1975

[21] Appl. No.: 629,270

[52] U.S. Cl. .............................................. 35/28.3
[51] Int. Cl.² ........................................ G09B 19/00
[58] Field of Search ........... 35/28.3, 28.5; 101/211; 46/24

[56] References Cited

UNITED STATES PATENTS

| 824,374 | 6/1906 | Munsell | 35/28.5 |
| 3,751,829 | 8/1973 | Foss | 35/28.3 |

FOREIGN PATENTS OR APPLICATIONS

| 2,218,076 | 11/1973 | Germany | 35/28.3 |

Primary Examiner—Harland S. Skogquist
Attorney, Agent, or Firm—Gersten Sadowsky; Donald R. Fraser

[57] ABSTRACT

Three colorants are arranged along three mutually intersecting edges of a color cube, one colorant to each edge, with the amount of each colorant varying from the intersection base corner of the cube to the corresponding outer cube corners. Diagonal planes are then taken through the color cube perpendicular to a diagonal line running from the intersection base cube corner to the diagonally opposite corner of the cube, one plane for each color chart of the system. A plurality of points are selected on each plane, one for each color on the associated chart, the amount of each of the three colorants required to make the chart colors being determined by the points selected on the plane.

3 Claims, 4 Drawing Figures

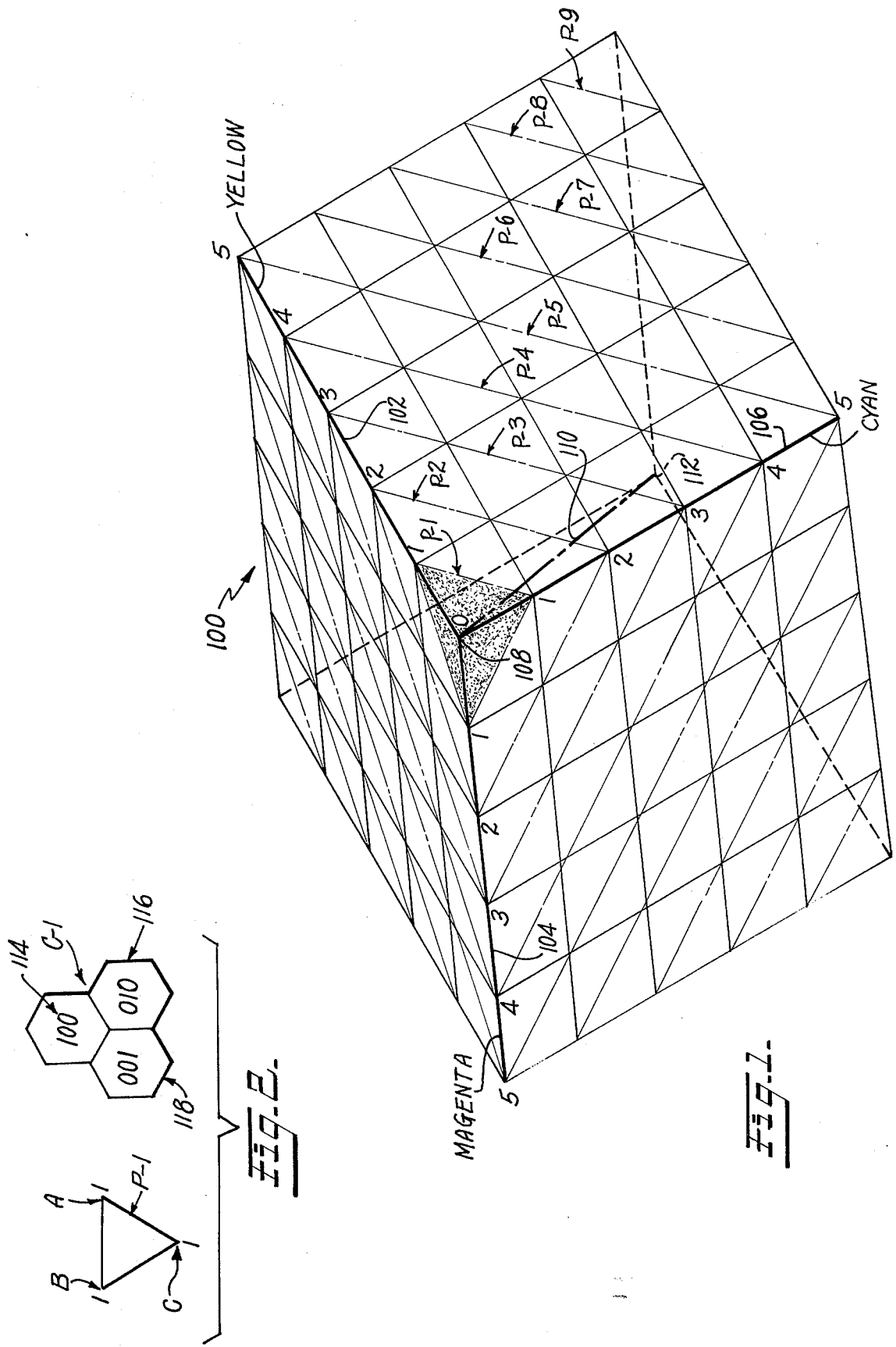

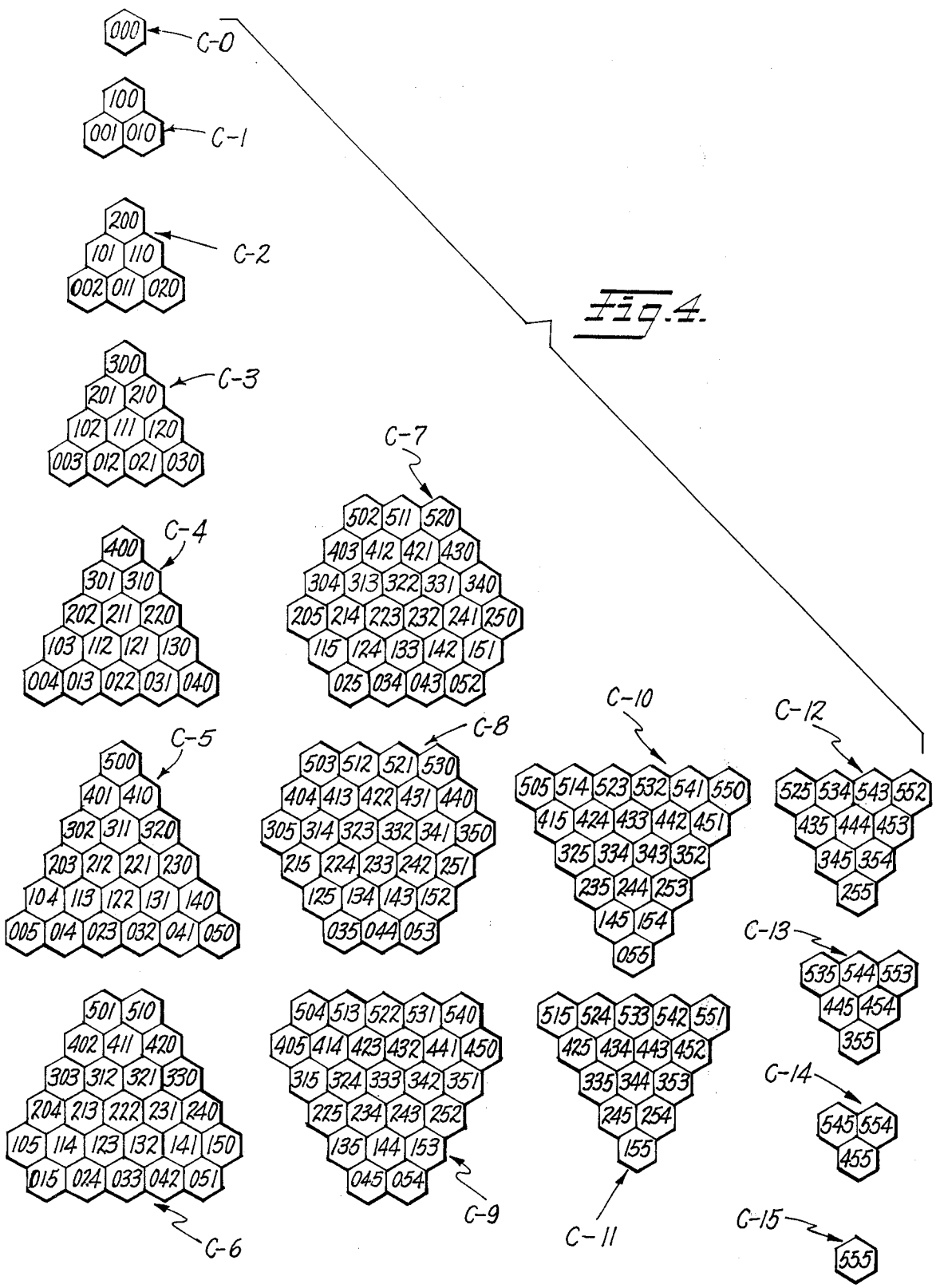

COORDINATED COLOR CHART SYSTEM, AND METHOD FOR PRODUCING SAME

BACKGROUND OF THE INVENTION

1. Field of the Invention

The present invention relates generally to charts utilized to display different colors in a systematic manner. More particularly, it relates to a new coordinated color chart system and to a method for producing the same whereby each color chart contains a plurality of coordinated, distinct colors obtained by varying the amounts of all of three colorants, it being possible with the invention to develop color charts so that they are arrayed on a linear scale generally corresponding to a linear gray scale.

2. Description of the Prior Art

Human beings have had a long fascination with the colors seen by their eyes, and many efforts have been undertaken to analyze and classify the many perceivable variations of color. These efforts have taken on a special importance in our age, when we have available to us the techniques and skills to produce color television, color photography, and color reproduction through printing, dyeing and other processes.

The many processes and techniques utilizing color in today's world demand that there be a system for classifying colors so that they can be readily compared, and to help those engaged in producing goods where color is a factor so that there is some common base for defining, selecting and reproducing different colors. In the printing field, for example, those producing original maps and pictures utilizing colors and which are intended for reproduction need to correlate their color selections with what can be reproduced by the available printing processes, if faithful reproductions are to be obtained. Moreover, selected colors should bear a known relationship to each other, so that desired contrasts and blends of colors are easily achievable.

Over the past several decades there have been many efforts made to rationalize the identification, classification and comparison of colors. Much basic work that is still commonly accepted was done by Munsell, one of the early results of which was a color chart that is the subject of U.S. Pat. No. 1,617,024. The Munsell system of color notation identifies color in terms of three characteristics, hue, value and chroma, and in the Munsell chart the three characteristics are arranged into orderly scales of equal visual steps. The Munsell system is useful for many purposes, but is not designed to solve in an everyday practical way the joint needs of those who must choose colors for use, and those who are then responsible for reproducing those colors through a printing or like process. Specifically, the Munsell system does not make it easy to select colors that are correlated and easily reproducible.

There have been other systems and devices invented for identifying and comparing colors, such as those which are the subject of U.S. Pats. Nos. 1,703,449, 2,409,285, 2,128,676, and 1,480,486. Again, while the inventions of these patents are useful, they do not offer the capability of identifying and readily comparing large numbers of colors to the satisfaction of increasingly sophisticated needs.

In more recent years the concept has developed of utilizing a color cube to identify and analyze different colors. In a color cube different primary colorants are displayed along the edges of a cube. Each face of the cube is then developed to look much like a checkerboard, except that each square on the face represents a unique combination of the primary colors displayed along the respective cube edges.

Each face of a color cube thus constitutes a color chart. In addition, vertical and horizontal planes are commonly passed through the cube to produce yet further color charts, examples of the use of the color cube concept being shown by U.S. Pat. Nos. 3,474,546 and 3,751,829.

Because the present invention also makes use of the color cube concept, it would be useful to describe a typical color cube system of the kind now in use. Assuming that the three primary colors of yellow, magenta and cyan are to be employed, such will be arrayed along three mutually perpendicular and intersecting edges of a cube, with say cyan running vertically, and magenta and yellow running at right angles to each other at the top of the cube in opposite directions from the vertical edge carrying cyan.

The cube corner where the three colorant-carrying edges merge is taken as the base point, and the amount of intensity of each color will vary from a minimum at this intersection base corner to a maximum at the opposite end of the edge. The color variation will normally be uniform along each edge, and the edge will be marked off in a scale of, say, percent value of the screen used in printing the color. The faces of the cube along which the three primary colorant-carrying edges border are then developed in the manner of a checkerboard, using the marked scale as a guide.

The result will be that each square on each face of the cube will have a specific amount of each of the two primary colorants present, the combination being unique for each square, whereby each square represents a unique color. The value of the third colorant will be uniform on each face. Each of the cube faces thus constitutes a color chart, whereon the colors are arranged rationally and in an orderly manner, but with a variation of only two of the three colorants.

But the number of color charts derivable from the color cube is not limited to the faces thereof. Rather, additional charts are derived conventionally by passing vertical and/or horizontal planes through the cube, at selected points along the color value scales. The result is a large numer of color charts, which can be arranged in several ways, and which in total present a very large number of distinct colors, the constituent primary colorants and the amount thereof required for each of the distinct colors being known.

More specifically, for each vertical or horizontal plane it is evident that the amount of one colorant will be constant, while the other two colorants will vary. Thus, for each selected value of a first colorant, all the possible combinations of colors derivable by varying the selected values of the other two colorants can be displayed on a checkerboard-like chart.

A set of charts derived conventionally from a color cube in this manner will offer a wide selection of unique colors to the person seeking specific colors for use on a map, picture or the like, and to a printer who must reproduce the colors of an original work. However, the set of charts is not easy to use, and often fails to give the results desired. The reasons are several.

First of all, it is evident that on each chart one of the colorant values will remain constant, while the values of the other two colorants are varied. This makes it difficult to find and compare colors where all three colorants are varied. Considerable movement around of the charts is required, and even when the proper charts are side-by-side, comparison of colors deep within the charts is difficult.

An extension of this problem occurs when it is desired to select complementary, but contrasting, colors. Again, because only two colorants are actually varied on a given chart, it is difficult to select contrasts, and to determine the compatibility of a selected color on one chart with a selected color on a second or other charts.

Other problems associated with the charts derived conventionally from a color cube by using such horizontal and/or vertical planes are the handling and logical filing of the charts, and the difficulty to the printer in selecting a matching color for an object to be reproduced. This last problem often results in a printer having to resort to trial and error to match a color, a process that often is lengthy and always wasteful of valuable printing resources.

There is thus need for a new system of color charts wherein the colors are arranged logically and rationally so that contrasting colors can be readily selected, complementary colors readily determined, and the proper mixture of inks for color reproduction easily analyzed. Further, there is need for a system of color charts wherein on each chart the values of all the three primary colorants are varied, not just two, so that color relationships can be more readily observed. The present invention is intended to satisfy these needs, and as such constitutes a significant advance in the color art.

SUMMARY OF THE INVENTION

The coordinated color chart system of the invention utilizes a color cube of the type described above, wherein three primary colorants are arranged on three mutually intersecting edges of a cube. However, according to the method of the invention the cube is disected in an entirely new manner, with totally new color charts resulting from such unique disection.

Specifically, in the invention a diagonal line is drawn through the cube from the base cube corner where the three colorant-carrying edges meet, to the diagonally opposite corner of the cube. Planes are then taken through the cube perpendicular to this diagonal line, one plane for each color chart. Again, the edges of the cube are scaled off, and as a result each point on each plane represents a unique combination of the primary colorants. However, unlike in color charts derived in the past from a color cube by taking horizontal and/or vertical planes, in the present invention the values of all three colorants are varied moving from chart to chart, not just two of the colorants with the value of the third remaining constant.

The color charts of the present invention offer several unique advantages. First, all of the colors on each of the diagonally derived charts are coordinated with each other, and a set of colors obtainable from all three primary colorants are arrayed side-by-side. But at the same time the colors on each chart are related to each other in a known, rational manner, and thus each chart reflects a family of colors. Moreover, all the color chips on a color chart in the invention will have the same general density, which contributes to their compatibility.

In addition, it is a relatively simple manner to select contrasting, yet coordinated, colors with the chart system of the invention. All of the colors on a given chart will contrast in density with similar colors on a next adjacent chart in a regularly arranged set, and will be in even stronger contrast to the colors on a chart twice removed. Further, assuming that the values of the three primary colorants are arranged from a minimum density at the intersection base cube corner to maximum density at the diagonally opposite cube corner, the successive diagonal charts taken from the base corner will be arrayed progressively generally along a grey scale. This can be of great value both to the person initially selecting colors, and to a printer who must later attempt to reproduce them.

While the coordinated color chart system of the invention has wide application, it provides a special color selection aid to those engaged in the origination and production of complex thematic maps and the like, wherein colors must be selected to represent different geological features and formations. The invention will realize important production economies in this field by enabling calculated reductions in the number of different colors selected to meet the color requirements of maps. Like many color charts now in wide use, the improved color chart system of the invention is characterized by uniformly sequenced segmental showings of regularly arranged color chips that individually correspond to different combinations of graduated densities or tints of three primary colorants. The color chips of the invention, however, are compositely viewed as if the color cube were sliced across the corner rather than parallel to one of the cube's sides, and this new grouping of colors presents in side-by-side relationship color chips of significant enough difference to be used to represent different map areas. In prior charts derived from a color cube in the conventional manner, adjacent color chips were very similar, and selection for map making purposes was most difficult.

It is a principal object of the present invention to provide a new method for deriving color charts from a color cube, whereby on each chart different colors derived from different combinatons of each of three primary colorants are arrayed in side-by-side relationship, the colors on each chart being correlated to each other in a rational manner.

Another object is to provide a system of color charts wherein the selection of both coordinated and contrasting colors is easily made, and wherein colors are arrayed for easy comparison.

A further object of the invention is to provide a system of color charts wherein the charts are arranged generally along a grey scale.

Other objects and many of the attendant advantages of the present invention will become readily apparent from the following Description of the Preferred Embodiment, when taken in conjunction with the accompanying drawings.

BRIEF DESCRIPTION OF THE DRAWINGS

FIG. 1 is a perspective, diagrammatic view of a color cube with the primary colorants yellow, magenta and cyan arrayed along three mutually perpendicular and intersecting edges thereof, and showing how a diagonal plane is taken according to the method of the invention for use in producing a color chart;

FIG. 2 is a diagrammatic view showing the relationship between one of the diagonal planes taken from the color cube of FIG. 1, and a three-chip color chart produced therefrom;

FIG. 4 is a diagrammatic view showing a complete array of color charts derived from the diagonal planes of FIG. 3.

DESCRIPTION OF THE PREFERRED EMBODIMENT

Figure 3:
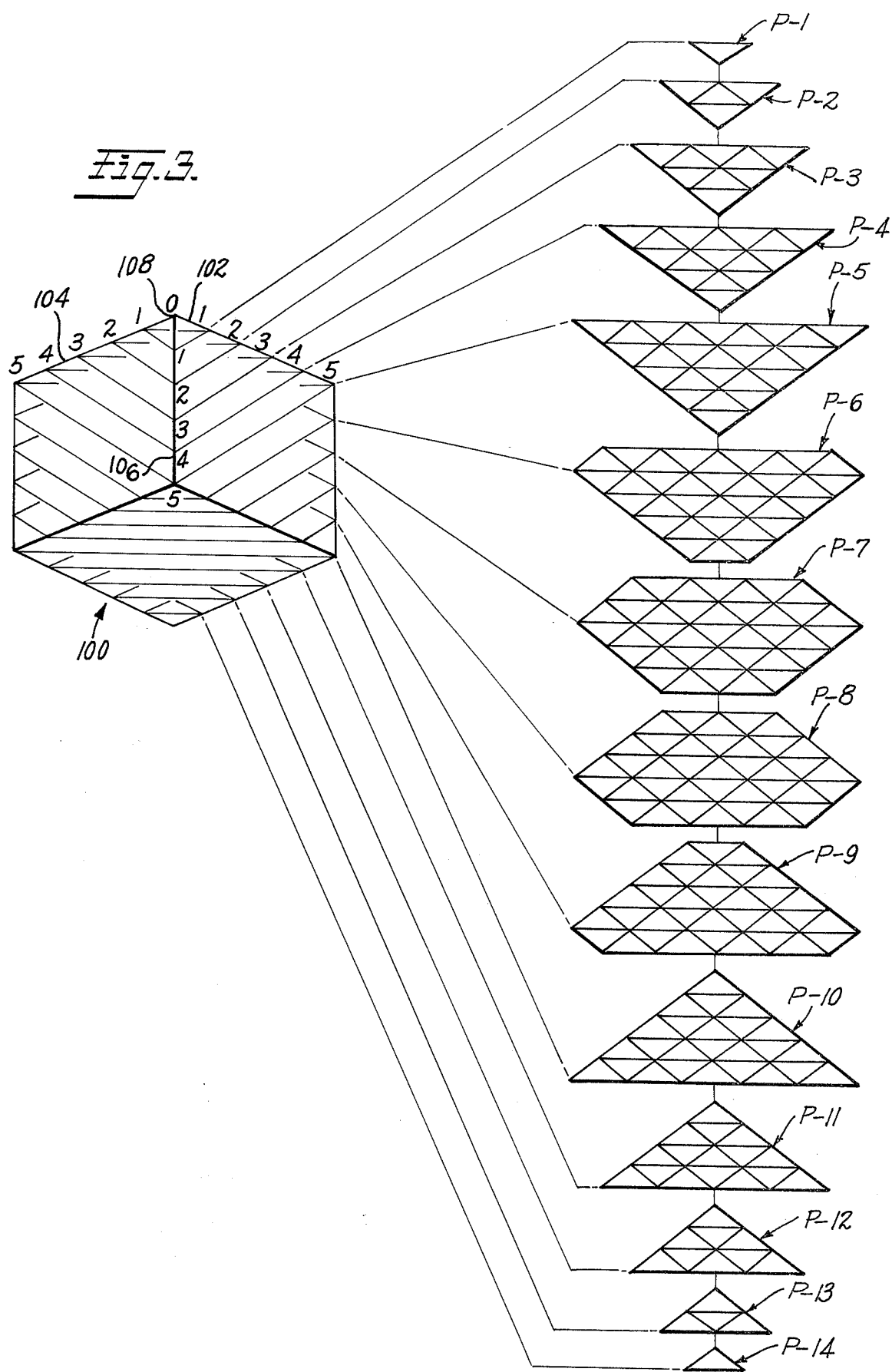
FIG. 3 is a diagrammatic view showing how a complete array of diagonal planes is generated from the color cube of FIG. 1, the cube in FIG. 3 being shown in a bottom perspective view, and the diagonal planes being displayed therebeside.

Referring now to FIG. 1, the method and the color chart system of the invention are based upon a color cube 100. Three primary colorants are arranged on three mutually intersecting edges 102, 104 and 106 of the color cube 100, and in the preferred embodiment of the invention the primary colorants are respectively yellow, magenta and cyan. The three colors all have the lightest value or tint at the corner 108 of the cube where the three cube edges 102, 104 and 106 mutually intersect, this cube corner being the base point.

The present invention is particularly adapted to printing inks, although the principles will obviously apply to other colorant materials as well. When using printing inks, it is assumed that the same tint densities are used for each of the three primary colorants, and in producing a color chart it is assumed that the tint screens will all have the same ruling, say 120-line, 133-line or 150-line. In this way the different color charts produced according to the invention are fully comparable.

Returning to FIG. 1, the edges 102, 104 and 106 of the cube 100 are all scaled off uniformly and evenly over a range of from 0 to 5. The number 0 located at the intersection base cube corner 108 of course represents the lightest tint value for each colorant, and in fact the resultant color at said corner 108 will normally be white, for a 0 value will normally indicate that no ink or colorant was used in the particular color.

The actual scale, and the number and spacing of divisions therealong, are both a matter of choice. For purposes of FIG. 1, five divisions of equal spacing running from 0 to 5 have been chosen for each colorant. To give meaning to these scale values, assume that the colorant in each case is a printing ink. In such instance, the values 0 through 5 can represent the percentage of yellow, magenta and cyan used at the indicated points along the scale. For example, at the point 2 along the edge 102 a 20 percent screen would then be used for printing the yellow colorant. In the instance of color printing inks it is often preferable to avoid using a single tint having a value greater than 50 percent, and thus the scale of FIG. 1 in each instance terminates at the value of 5. It is again emphasized, however, that the extent and the manner of dividing the scales along the cube edges carrying the primary colorants is a matter of choice, and in some instances it may be desirable to utilize ten divisions, or more.

Returning again to FIG. 1, according to the method of the invention a diagonal line 110 is drawn from the intersection base cube corner 108 to the diagonally opposite cube corner 112. Thereafter, according to the present method, diagonal planes are passed through the color cube 100, perpendicular to the diagonal line 110. Such a diagonal plane is shown at P-1 in FIG. 1, the portions of the edges 102, 104 and 106 between the plane P-1 and the base corner 108 being shown in broken lines for purposes of clarity in showing the plane P-1. As is obvious from FIG. 1, the diagonal plane P-1 is so positioned along the diagonal line 110 that the plane passes through the points indicated by the scale value 1 on the colorant-carrying cube edges 102, 104 and 106. Preferably, the three colorant-carrying cube edges 102, 104 and 106 will always be scaled identically, for ease in preparing the color charts from the diagonal planes passed through the cube.

Turning now to FIG. 2, the manner in which the diagonal plane P-1 is utilized to produce a color chart C-1 is illustrated. As has been noted, the diagonal plane P-1 contains the points 1 on the scales for yellow, magenta and cyan, such points being indicated at A, B and C in FIG. 2, respectively.

It is common practice with color charts of the present type to indicate the amount of each of the primary colorants required to produce a given color chip by a three-digit code. In the code used in the invention the first number will refer to the colorant yellow, the second to magenta, and the third to cyan. Thus, for the example of printing inks given herein, a specific color chip on a color chart may be identified by a three digit code such as 451, which means that the color on the chip is obtained by combining:

yellow, at a 40 percent tint value;
magenta, at a 50 percent tint value; and
cyan, at a 10 percent tint value,
where the numbers 0 through 5 on the scale represent from 0% to 50% tint values of the colorants.

Where the amount of a given one or more of the three primary colorants is zero, then a 0 will be entered into the identifying code for that color. This is, assuming in the example just given that the amount of yellow is reduced to zero, then the identifying code would be amended to read 051.

Using this three-digit code, in the order of yellow, magenta and cyan, and turning again to FIG. 2, the color chart C-1 is derived from the diagonal plane P-1 in the following manner. It is first noted that the plane P-1 contains the three scale points A, B and C, and thus three specific colors are identified by the plane, one for each of said scale points. Turning to the chart C-1, such contains three color chips 114, 116 and 118, corresponding to the points A, B and C, respectively, taken from the diagonal plane P-1. Taking first the point A, and referring again to FIG. 1, it is seen that at this point A the value of the colorant yellow is 1, whereas the value of both magenta and cyan is 0. Thus, the three-digit identifying code for the color chip 114 will read 100. Similarly, at the point B the value of yellow and cyan will be 0, while the value of magenta will be 1. The code for the color chip 116 is thus 010. Finally, the identifying three-digit code for the color chip 118 will be 001, since the value of both yellow and magenta will be 0. The three-digit code for each color chip has been placed on the chip in the color chart C-1 of FIG. 2.

In the invention diagonal planes are passed through the color cube at spaced locations along the diagonal line 110, to produce a complete array of diagonal planes. Referring to FIG. 3, a set of diagonal planes P-1 through P-14 is shown, derived from the color cube of FIG. 1 wherein the scale of each cube edge 102, 104 and 106 is from 0 to 5 with equal spacing therebetween, and the planes P-1 through P-14 are taken at the numbered scale points, as shown on the color cube 100 in FIG. 3, whereby such planes are evenly spaced along the diagonal line 110.

As will be evident from an examination of FIG. 3, each of the diagonal planes P-1 through P-14 contains a plurality of points corresponding to readily identifiable scale locations within the color cube 100, since each of the planes is taken through known scale points. For example, the diagonal plane P-5 contains 21 identified scale points, and each of these points indicates a unique combination of the three colorants, and hence a unique color. Thus, by simply noting the identifying scale numbers for each of the 21 points included in the diagonal plane P-5, a set of 21 unique colors for inclusion on a color chart is identified.

Turning finally to FIG. 4, such illustrates a set of color charts C-0 through C-15. The chart C-0 is of course taken at the corner 108 of the color cube 100, where the value of all three colorants is zero, and thus the three-digit code for the single color chip thereon is 000. Similarly, the color chart C-15 represents the corner 112 of the color cube, where all of the colorants have maximum value. Thus, it also includes a single color chip, carrying the three-digit identifying code of 555. The color charts C-1 through C-14 correspond to the diagonal planes P-1 through P-14 of FIG. 3, and it should now be readily apparent how the number of color chips for each color chart, and the three-digit number for each chip, are derived. As is apparent, the color chips of all of the charts in FIG. 4 have their identifying three-digit codes entered thereon, as such relate to the color cube 100.

A set of color charts produced according to the method of the invention has certain notable features. First of all, referring to FIG. 4, it should be obvious that on a given one of the color charts all three of the primary colorants are varied, and thus a more or less complete array of colors is presented on each chart. Moreover, all of the colors on each chart are uniquely related to and are compatible with each other and have the same basic density.

With regard to this last point, it is noted that if the numbers making up the three-digit codes on each of the color chips on a color chart are added together, the result will be identical for each color chip on the chart. Referring again to the sample color chart C-5, the numbers comprising the three-digit code for each color chip thereon will total to the number five. This fact is not only related to the compatible nature of the color chips on the chart, but is also useful in day-to-day use of the color chart system.

For instance, given the fact that the color chart from which a particular color chip comes can be determined merely by adding together the numbers of its identifying three-digit code, it is very easy to locate the parent color chart for a particular color, and thus its family of compatible colors. The feature is also most useful in selecting contrasting colors, say for use in map making. Where a set of color charts is derived as described herein, using a uniformly spaced scale of 0 through 5 for each of the primary colors, there will be an even graduation of contrast moving in continuous sequence from one color chart to another. If a greater degree of contrast is desired that is offered by moving in continuous sequence from chart to chart, say the chart C-5 to the chart C-6, such can be obtained by moving in sequence from odd-numbered charts to odd-numbered charts, such as from C-5 to C-7, instead.

It must also be noted that when the color cube 100 is arranged as in FIG. 1, the color charts resulting from taking diagonal planes at spaced locations along the diagonal line 110 from the base cube corner 108 to the opposite cube corner 112 will progress in tone from light to dark. Such progression in fact corresponds generally to the grey scale, and thus the summation numbers for the charts C-0 through C-15 are in fact generally related to the grey scale. This fact can be of considerable significance to the printer in his work, and to others who can make use of a set of color charts wherein the color chips on each chart are of equal tint density, with each successive planes offering colors darker in density.

In summary, it is seen that the method of the present invention and the system of coordinated color charts produced thereby provides color charts wherein all three primary colorants change simultaneously as one moves from chart to chart in sequence, and the consecutive charts offer progressively increasing color densities. Nothing similar has ever been available before, and the usefulness of the invention to cartographers, artists, the printing and paint industry, and others, is readily apparent.

Obviously, many variations are possible in the invention. In particular, the invention is adaptable to the use of different colors on the color cube, and to the use of different scales. Other modifications are also possible, within the teachings of the invention.

We claim:

1. A color chart displaying a plurality of coordinated distinct colors, each coordinated color on said chart being obtained by utilizing specific amounts of each of only independently variable, constant tint density colorants yellow, magenta, and cyan, and being represented by a specific point in a plane disposed perpendicular to a line drawn between one point and another point diagonally opposite thereto within the space of a color cube on which said colorants are arranged along three mutually perpendicular edges of said cube mutually intersecting at said one point, one of said colorants corresponding to each edge with the amount of each colorant uniformly and progressively increasing along its respective edge from a minimum at said one point to a maximum at corresponding cube corners, and wherein there is associated with each said specific point on said plane a unique combination of amounts of each said colorants which is characterized by a constant tint density.

2. A series of related color charts each displaying a plurality of coordinated distinct colors, each coordinated color on a said chart being obtained by utilizing specific amounts of each of only independently variable, constant tint density colorants yellow, magenta, and cyan, and being represented by a specific point in a plane disposed perpendicular to a line drawn between one point and another point diagonally opposite thereto within the space of a color cube, there being a separate plane disposed perpendicular to said diagonal line associated with each of said color charts, said planes being spaced from each other along said diagonal line, said colorants being arranged along three mutually perpendicular edges of said cube mutuallly intersecting at said one point, one of said colorants corresponding to each edge with the amount of each colorant uniformly and progressively increasing along its respective edge from a minimum at said one point to a maximum at corresponding cube corners, and wherein there is associated with each said specific point on each said plane a unique combination of amounts of each said colorants which is characterized by a constant tint density.

3. A series of related color charts as set forth in claim 2, wherein said perpendicular planes are spaced equally along said diagonal line, whereby said charts form a linear scale relationship generally corresponding to a linear gray scale.

* * * * *